United States Patent [19]

Grace

[11] Patent Number: 4,704,316

[45] Date of Patent: Nov. 3, 1987

[54] MANUFACTURE OF RECONSOLIDATED WOOD PRODUCTS

[75] Inventor: William G. Grace, Warragul, Australia

[73] Assignee: Repco Limited, Melbourne, Australia

[21] Appl. No.: 764,593

[22] PCT Filed: Nov. 23, 1984

[86] PCT No.: PCT/AU84/00243

§ 371 Date: Jul. 23, 1985

§ 102(e) Date: Jul. 23, 1985

[87] PCT Pub. No.: WO85/02369

PCT Pub. Date: Jun. 6, 1985

[30] Foreign Application Priority Data

Nov. 23, 1983 [AU] Australia .............................. PG2516

[51] Int. Cl.⁴ ............................ B32B 5/12; B29J 5/04; B27L 11/08

[52] U.S. Cl. ...................................... 428/106; 428/15; 428/17; 428/107; 428/113; 428/114; 428/88; 428/89; 428/109; 428/110; 428/537.1; 428/284; 156/177; 156/178; 156/180

[58] Field of Search ................. 428/106, 107, 284, 15, 428/17, 88, 113, 114, 89, 537.1, 109, 110

[56] References Cited

U.S. PATENT DOCUMENTS

| | | | |
|---|---|---|---|
| 3,493,021 | 2/1970 | Champigny | 144/317 |
| 4,061,819 | 12/1977 | Barnes | 428/294 |
| 4,232,067 | 11/1980 | Coleman | 428/17 |
| 4,355,754 | 10/1982 | Lund et al. | 428/113 |
| 4,388,133 | 6/1983 | Hirao et al. | 428/106 |
| 4,508,772 | 4/1985 | Churchland | 428/106 |

*Primary Examiner*—P. C. Ives

*Attorney, Agent, or Firm*—Sughrue, Mion, Zinn, Macpeak and Seas

[57] ABSTRACT

Reconsolidated wood product (22) formed by compressing and bonding natural wood which has been rended to form open lattice work webs (14) of naturally interconnected wood strands. The webs (14) are laid over each other in overlapping fashion so as to extend at an angle to the direction of extent of the product (22), with opposite ends of the webs being closest to respective opposed surfaces (60, 64) of the product.

5 Claims, 5 Drawing Figures

MANUFACTURE OF RECONSOLIDATED WOOD PRODUCTS

BACKGROUND OF THE INVENTION

This invention relates to a reconsolidated wood product and to a process for forming a reconsolidated wood product.

The Coleman U.S. Pat. No. 4,232,067 describes a reconsolidated wood product formed from at least one flexible open lattice work web of naturally interconnected wood strands generally aligned along a common grain direction, a substantial proportion of said strands being substantially discrete but incompletely separated from each other; said web having been consolidated by compression in a compression direction transverse to said grain direction whilst substantially maintaining the wood strands aligned along same common grain direction and said strands being bonded together to hold them in juxtapositions assumed pursuant to said consolidation.

That patent specification also describes a process for forming a reconsolidated wood product from a flexible open lattice work web of naturally interconnected wood strands, said web being formed by partially rending natural wood so that said strands are generally aligned along a common grain direction, a substantial proportion of said strands being substantially discrete but incompletely separated from each other, said process comprising compressing the web in a compression direction transverse to said grain direction to consolidate the strands whilst maintaining them such as to substantially extend in said original grain direction and bonding said strands together to hold them in juxtapositions assumed pursuant to said consolidation.

SUMMARY OF THE INVENTION

An object of the invention is to provide a process and product as above described in which webs are laid-in in a fashion facilitating density control in the end product.

In one aspect of the present invention, there is provided a reconsolidated wood product as described above wherein said web comprises one of a plurality of overlaid like webs which are consolidated by said compression whilst being substantially maintained with said wood splinters or strands aligned along the respective common grain directions and bonded together by said bonding to hold them in the juxtapositions assumed pursuant to said consolidation, and wherein said webs are arranged along the length of said product so that opposite ends of the webs are closest to respective opposed surfaces of the said product, the webs being arranged at an acute angle to each of said surfaces, said surfaces being transverse to said compression direction. Where the surfaces are generally parallel, it is preferred that the webs make an angle less than 5° to the said surfaces.

The invention also provides a process as described above wherein said web comprises one of a number of like webs which are together compressed to effect said consolidation and which are together bonded by said bonding, the webs being overlaid one upon the other in such a fashion that in the finished said product, the webs are arrayed in side-by-side relationship along the length of the product and are positioned so that opposite ends of the webs are closest to respective opposed surfaces of the product, the webs being arranged at an acute angle to both of those surfaces. Preferably, the said acute angle is less than 5°. Preferably said webs are cut to common lengths prior to said compression.

Where said webs are formed from natural wood products such as logs, exhibiting a taper from one end to the other, said webs exhibit a decrease in mass per unit length from one end to the other. In one embodiment of the present invention, the said webs, although having a common grain direction as described are arranged so that there are substantially equal numbers of said webs having their ends of greater mass per unit length located towards one said surface and located towards the other said surface respectively. For example alternate webs may have the ends of greater mass per unit length located towards one said surface, the remainder having the ends of greater mass per unit length located towards the other said surface. In many instances, however, any variation in density may not be sufficient to cause substantial lack of homogeneity across the cross-section of the product. Furthermore, in some instances, it may be desirable to provide a product having increased density towards one surface in which case that may be arranged for by having a preponderance of webs with ends of greater mass per unit length located towards that surface.

BRIEF DESCRIPTION OF THE DRAWINGS

The invention is further described by way of example only with reference to the accompanying drawings in which.

DETAILED DESCRIPTION OF THE INVENTION

Figure 1:
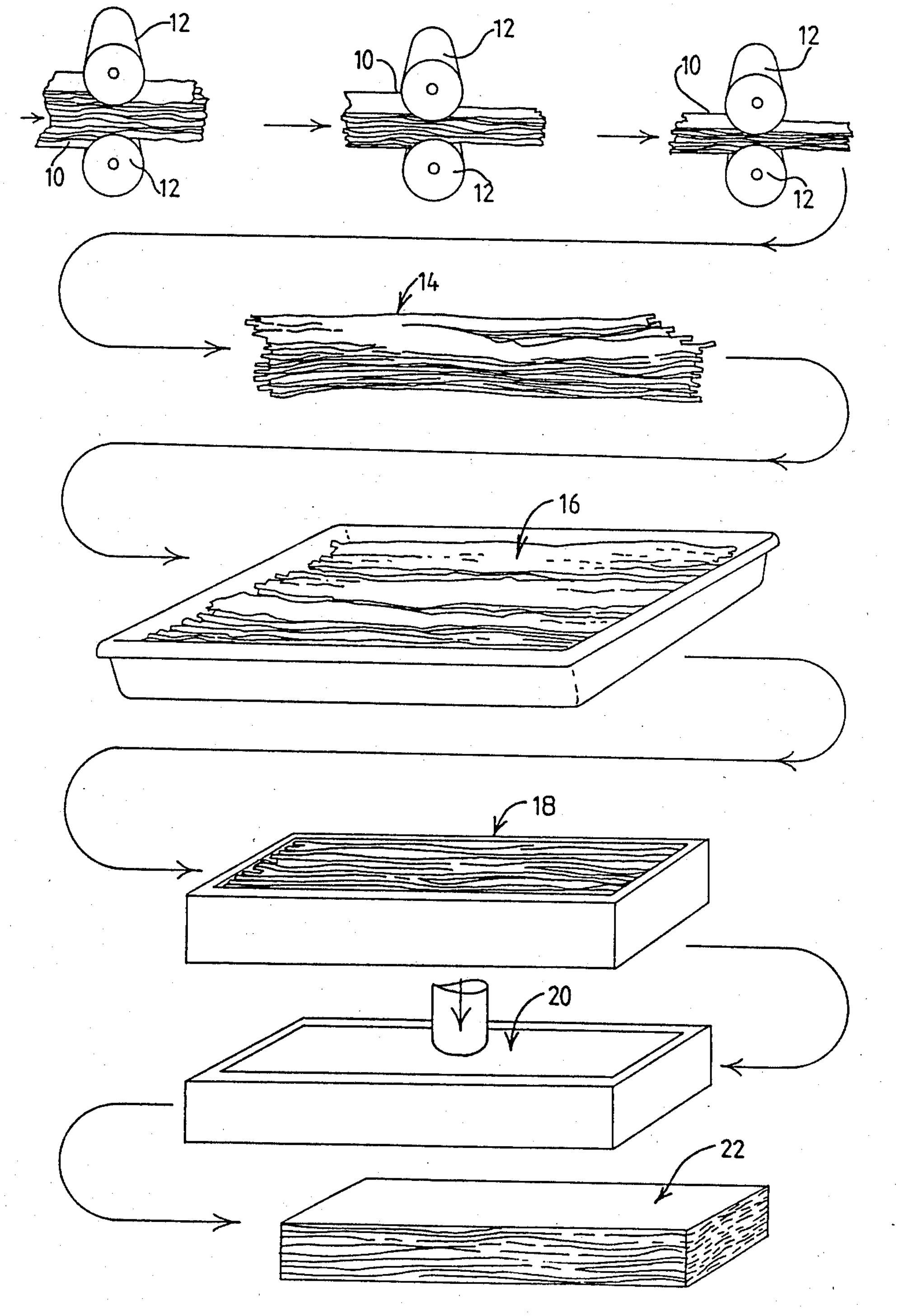
FIG. 1 is a diagram showing the steps in processing reconsolidated wood products in accordance with the invention described in the aforementioned U.S. Pat. No. 4,232,067.

Referring firstly to FIG. 1, in the process of U.S. Pat. No. 4,232,067 natural wood logs 10 are first partially broken down, being passed successively between rollers 12 of one or more roller pairs to induce cracking and thence progressively open up the log structure to form it into a web of loosely interconnected splinter-like strands (called "splinters" in U.S. Pat. No. 4,232,067). The resultant web, shown at 14 in FIG. 1 is of flexible open lattice work form, individual strands maintaining the original grain direction of the wood. Adhesive is then applied to the webs 14 such as by immersion in a suitable liquid adhesive in a bath 16 as shown. After removal of excessive adhesive, a plurality of webs 14 are assembled together, such as by laying them one over the other in a suitable mould 18. The assemblage of overlaid webs 14 is then compressed in mould 18 such as by compression between the base of the mould and an upper press element 20 as shown, and the adhesive is cured, to form the final product 22.

Product 22 is characterized in that it comprises a plurality of wood strands which remain naturally interconnected and which extend generally in the original grain direction of the wood. The strands are bound together by the adhesive but are positioned in somewhat displaced relative locations as compared with the positions occupied in the original log 10. The product 22 has been found to be particularly satisfactory as it possesses good mechanical properties, due to the relatively small degradation of the original wood structure which is caused by the process, as well as good nailability and a generally pleasing appearance.

Figure 2:
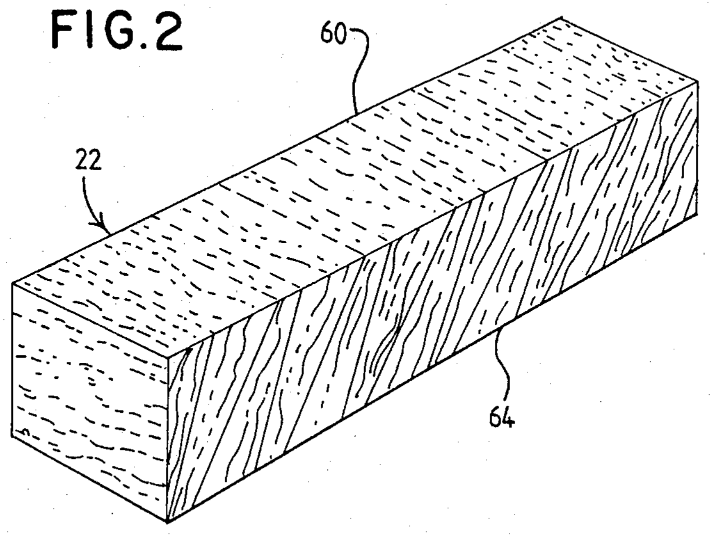
FIG. 2 is a perspective view of a reconsolidated wood product having constituent webs laid-in accordance with this invention.
Figure 3:
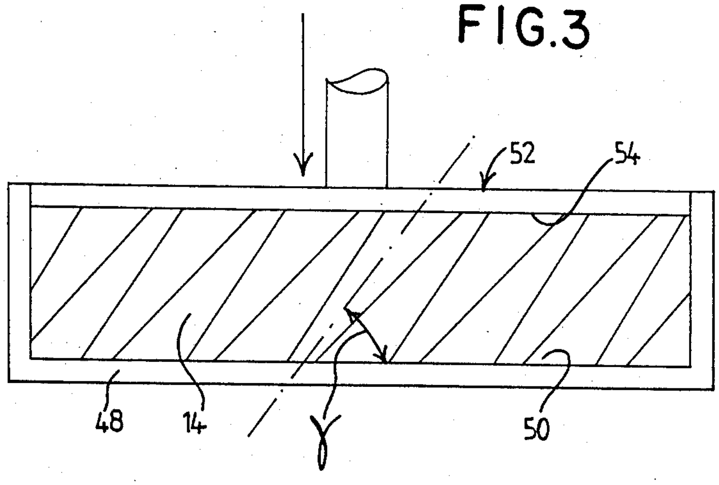
FIG. 3 is an upright axial section of a mould useful for forming the product of FIG. 2.

FIG. 2 illustrates a modified product 22 with a varied manner of arranging webs prior to the consolidation step referred to in FIG. 1. More particularly, as shown in FIG. 3 the webs are loaded into a press 48 (constituting the mould 18 in FIG. 1) for the consolidation of the webs in generally parallel arrangement with the grain directions parallel. The lower ends of the webs rest on the base surface 50 of the press 48, with the webs extending at an angle "$\gamma$" as shown in FIG. 3 upwardly to upper ends thereof which are arrayed along the length of the surface 50. Then, during compression and consolidation, an upper press plate 52 is moved downwardly towards surface 50 so that the under surface 54 thereof engages the upper surface presented by the upper ends of the webs 14 and presses downwardly. Preferably, the arrangement is such that the dimension between corresponding surfaces 60, 64 of the end product formed against the respective surfaces 50, 54 is 1/6 to $\frac{1}{4}$ the distance prevailing before compression is effected and the angle between the webs and surfaces 60, 64 is less than 5°.

Figure 4:
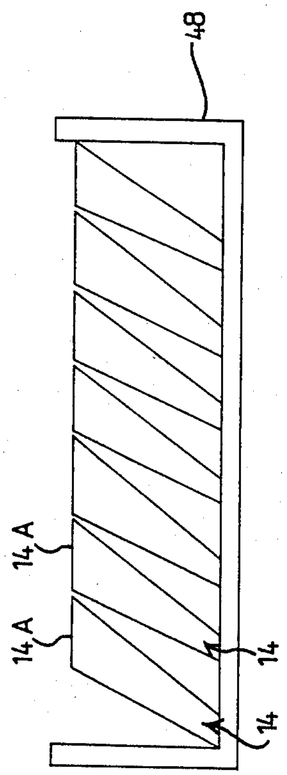
FIGS. 4 and 5 are diagrams illustrating two alternative methods of laying in webs prior to reconsolidation.

FIG. 4 illustrates an arrangement in which ends 14A of the webs 14, being the ends of greater mass per unit length formed at ends of the webs corresponding to ends of the initial logs 10 which were closest to the base of the tree from which the logs were cut, are arranged adjacent to each other and uppermost in the press 48.

Figure 5:
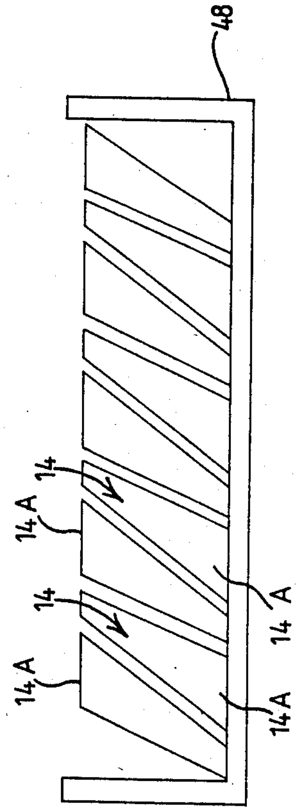

FIG. 5 shows an arrangement in which alternate ones only of the webs 14 have the ends 14A uppermost, the intervening webs having the ends 14A lowermost. The arrangement in FIG. 5 facilitates the achievement of a product 22 having uniform density across the distance between the opposed surfaces 60, 64 of the end product.

The formation of the consolidated wood product via the above-mentioned method where the webs 14 are at an angle to the surfaces 60, 64 of the product 22 has the effect that defects in product 22 occurring at locations corresponding to web ends appear at the surfaces of the end product 22 where they can be readily, planed off. Furthermore, as mentioned in U.S. Pat. No. 4,232,067, it is envisaged that, instead of forming products in accordance with the invention by batch loading of webs into a mould for consolidation, it would be possible, equally, to use a continuous process where webs were loaded continuously into a mechanism operable to effect the desired compression. It will be appreciated that the arranging the webs at an angle as herein described facilitates infeeding in a continuous fashion into any mechanism for effecting consolidation by continuous processes.

The arrangement described also has the advantage that the webs 14 may be cut to a constant length before feeding into the described arrangement prior to compression and this too facilitates the obtaining of a uniform product.

The described arrangement has been advanced merely by way of explanation and many modifications may be made thereto without departing from the spirit and scope of the invention as defined in the appended claims.

I claim:

1. A reconsolidated wood product having a pair of opposed side surfaces formed from a plurality of flexible open lattice work webs each of naturally interconnected wood strands generally aligned along a common grain direction, a substantial proportion of said strands of each web being substantially discrete but incompletely separated from each other; said webs having been superposed and consolidated by compression in a compression direction substantially transverse to said grain direction while substantially maintaining the wood strands aligned along same common grain direction and said strands of said superposed webs being bonded together to hold them in juxtapositions resulting from said consolidation, wherein said webs are arranged generally parallel to each other along the length of said product with the opposite ends of each web extending to respective ones of the opposed side surfaces of the product, the webs being arranged at an acute angle to each of said surfaces and said surfaces being transverse to said compression direction.

2. A reconsolidated wood product as claimed in claim 1 wherein each said web exhibits a decrease in mass per unit length from one end to the other, and said webs are arranged so that there are substantially equal numbers of said webs having their ends of greater mass per unit length extending to one said side surface as there are webs having their ends of greater mass per unit length extending to the other said side surface respectively.

3. A reconsolidated wood product as claimed in claim 2 wherein alternate said webs have their ends of greater mass per unit length extending to one said side surface, the remainder having the ends of greater mass per unit length extending to the other said side surface.

4. A reconsolidated wood product as claimed in claim 1 wherein each said web exhibits a decrease in mass per unit length from one end to the other, and there are a preponderance of webs with ends thereof of greater mass per unit length extending to one said side surface.

5. A reconsolidated wood product as claimed in claim 1 wherein said webs are of substantially equal length.

* * * * *